United States Patent [19]

Strait

[11] Patent Number: 4,991,961

[45] Date of Patent: Feb. 12, 1991

[54] MOVING MIRROR TILT ADJUST MECHANISM IN AN INTERFEROMETER

[75] Inventor: David R. Strait, Madison, Wis.

[73] Assignee: Nicolet Instrument Corporation, Madison, Wis.

[21] Appl. No.: 357,526

[22] Filed: May 26, 1989

[51] Int. Cl.⁵ .............................................. G01J 3/45
[52] U.S. Cl. .................................................... 356/346
[58] Field of Search .......................................... 356/346

[56] References Cited

U.S. PATENT DOCUMENTS

| | | |
|---|---|---|
| 3,936,193 | 2/1976 | Auth . |
| 4,383,762 | 5/1983 | Burkert .. |
| 4,556,316 | 12/1985 | Doyle . |
| 4,693,603 | 9/1987 | Auth . |
| 4,710,001 | 12/1987 | Lacey .............................. 396/346 X |
| 4,881,814 | 11/1989 | Hoult .................................. 356/346 |

Primary Examiner—David L. Willis
Assistant Examiner—Matthew W. Koren
Attorney, Agent, or Firm—Foley & Lardner

[57] ABSTRACT

An interferometer modulator (10) has a housing (12) that encloses a moving mirror (14) attached to a mirror arm (18) which is suspended by links (34, 36) from the housing (12). The links (34, 36) are attached to the mirror arm (18) at swinging pivots (42, 44) and are attached to the housing (12) at fixed pivots (46, 48). One of the fixed pivots (46) is mounted within an adjustable block (68) the position of which may be adjusted by the turning of adjust screws (82, 76). Turning of one of the adjust screws (82) adjusts the distance between the fixed pivots (46, 48) to match the distance of the swinging pivots (42, 44), thus correcting for vertical tilt. Turning of the second of the adjust screws (76) compensates for any angular differences that would prevent the links (34, 36) from moving in the same plane of motion, thus correcting for horizontal tilt.

30 Claims, 6 Drawing Sheets

MOVING MIRROR TILT ADJUST MECHANISM IN AN INTERFEROMETER

FIELD OF THE INVENTION

The present invention pertains generally to the field of moving mirror tilt adjustment such as that used in Fourier transform interferometric spectrometers to maintain orthogonality between the moving mirror and the direction of motion of the moving mirror in such spectrometers.

BACKGROUND OF THE INVENTION

Fourier transform infrared (FTIR) interferometric spectrometers are widely used in the analysis of chemical compounds. By measuring the absorption of infrared radiation by an unknown sample at various wavelengths in the infrared spectrum and comparing the results with known standards, these instruments generate useful information with respect to the chemical makeup of the unknown sample. In a typical FTIR spectrometer, infrared radiation from an infrared emitting source is collected, passed through an interferometer, passed through the sample to be analyzed, and brought to focus on an infrared detector. The interferometer system, in combination with the sample, modulates the intensity of the infrared radiation that impinges on the detector, and thereby forms a time variant intensity signal. It is the function of the detector to convert this time variant intensity signal to a corresponding time varying current. The current, in turn, is converted to a time varying voltage, which is presented to an analog-to-digital converter and then stored as a sequence of digital numbers to be processed in a processor associated with the spectrometer.

One important feature of the FTIR spectrometer is the moving mirror element that modulates the analytical radiation used by the instrument to study samples. The moving mirror allows a time-domain interferogram to be generated which, when analyzed, allows high resolution frequency-domain spectra to be produced. The computer performs a Fourier transform on the data to produce a spectrum which shows spectral-energy versus frequency.

It is critical in the design of these instruments that the surface of the moving mirror be very accurately held in an orthogonal position, i.e., at a right angle, to the direction of the motion of the moving mirror. Positional accuracy of the moving mirror is crucial because deviations in the mirror alignment produce small errors in the time-domain interferogram that may translate into large errors in the frequency-domain spectrum. In a typical interferometer, deviations of the moving mirror larger than one wavelength of the analytical radiation used are considered significant and can seriously degrade the quality of the entire instrument.

In one type of interferometer, the moving mirror is mounted upon an arm that is guided along its line of motion by suspension from two links spaced a distance apart. The links are pivotably attached to the mirror arm and to the housing of the interferometer at pivots, thus forming a parallelogram. Such an arrangement is sometimes referred to as a "porch swing" style of interferometer because of the likeness of its movement to its namesake.

Where the parallelogram formed by the mirror arm, links, and housing is not true, i.e. the links are not of equal length or not in the same plane of motion, the moving mirror may be tilted along its path of motion, thus introducing errors into the spectrum. The two horizontal members (the housing and the mirror arm) must be of equal length, as must the vertical members (the links), in order to keep the mirror from tilting during travel. One prior art design uses adjusting collets at one of the pivot points along the mirror arm to fine tune the lengths of the horizontal and vertical members. There are, however, problems associated with the use of such collets to make adjustments to correct for mirror tilt. For example, the adjustments are made on the moving portion of the mechanism, so that the mirror motion must be stopped for each adjustment iteration and then restarted to check the resulting tilt. The collet adjustment is non-linear, so that the results of each adjustment iteration are not necessarily predictable. Finally, the collets are held in place by set screws that must be loosened and re-tightened with each adjustment. However, the tightening of the set screws themselves affects the alignment.

The prior art means of adjusting the tilt in a moving mirror of an interferometer is therefore inaccurate, slow, and awkward. Accordingly, a need has arisen for a mechanism to adjust the tilt of a moving mirror that is accurate and efficient.

SUMMARY OF THE INVENTION

The present invention provides an accurate, time-saving, and predictable adjustment mechanism for the correction of tilt in the moving mirror of an interferometer of the "porch swing" type. One of the pivots of the housing from which a link is suspended is mounted in an adjustable block. The block is capable of moving relative to the other pivots, thus providing a means of enabling a user to minimize tilt. The block may be used to adjust the distance between the pivots in the housing to match the distance between the pivots in the mirror arm. This is correction of "vertical" tilt. The block may also be moved to compensate for any angular differences that would prevent the links from swinging in the same plane of motion. This is correction of "horizontal" tilt. The less critical pivot-to-pivot distance within each link can be adequately controlled using close tolerance machining methods.

The adjustable block is moved to compensate for vertical tilt by the turning of an adjust screw that simultaneously moves a cam against an inclined surface of the adjustable block. This alters the pivot-to-pivot distance of the pivots in the housing. The adjustable block is moved to compensate for horizontal tilt by the turning of a second adjust screw that rotates the adjustable block in a manner that will bring the links into and out of parallel alignment. Since the adjustment mechanism is located on a fixed portion of the parallelogram, i.e. the housing, the mirror tilt adjustments can be performed while the mirror is in motion. This eliminates the necessity of painstaking iterations and allows one to immediately ascertain the effects of any adjustments. The correction of the vertical tilt is further facilitated in that a linear relationship is involved.

Further objects, features, and advantages of the invention will be apparent from the following detailed description taken in conjunction with the accompanying drawings.

DETAILED DESCRIPTION OF THE INVENTION

Figure 1:
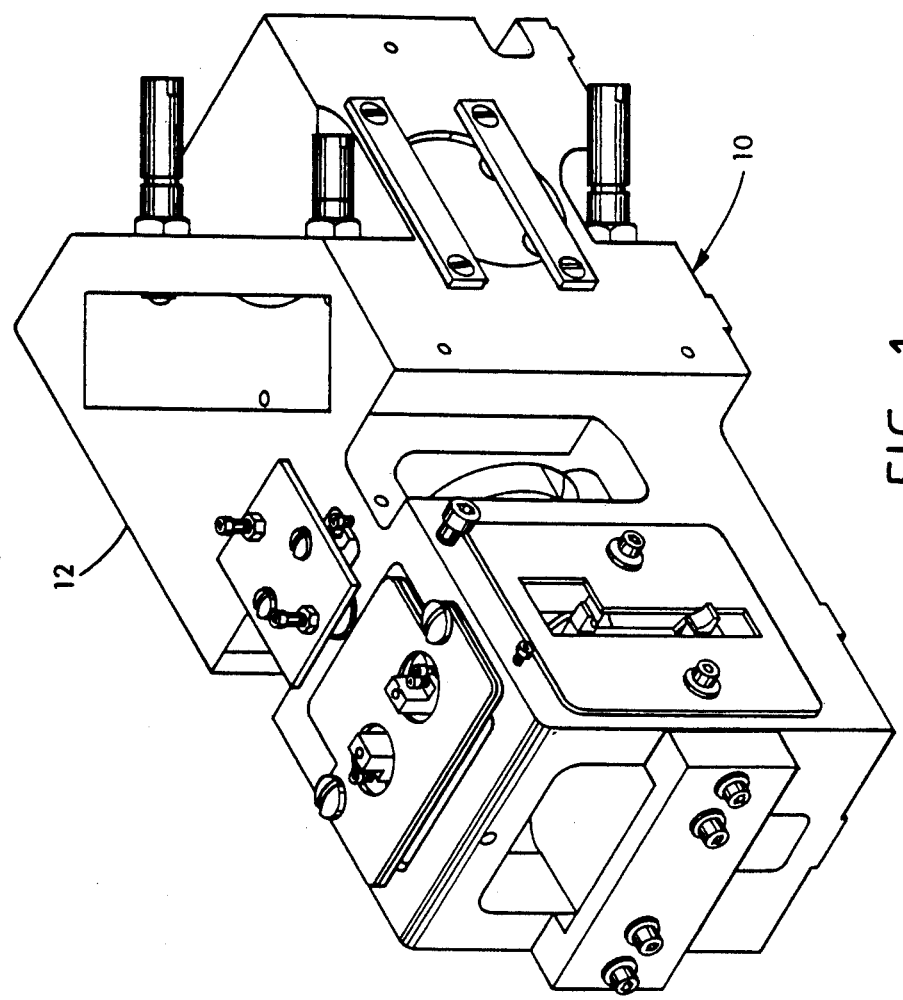
FIG. 1 is a perspective view of a interferometer modulator that uses the moving mirror tilt adjust mechanism of the present invention.
Figure 2:
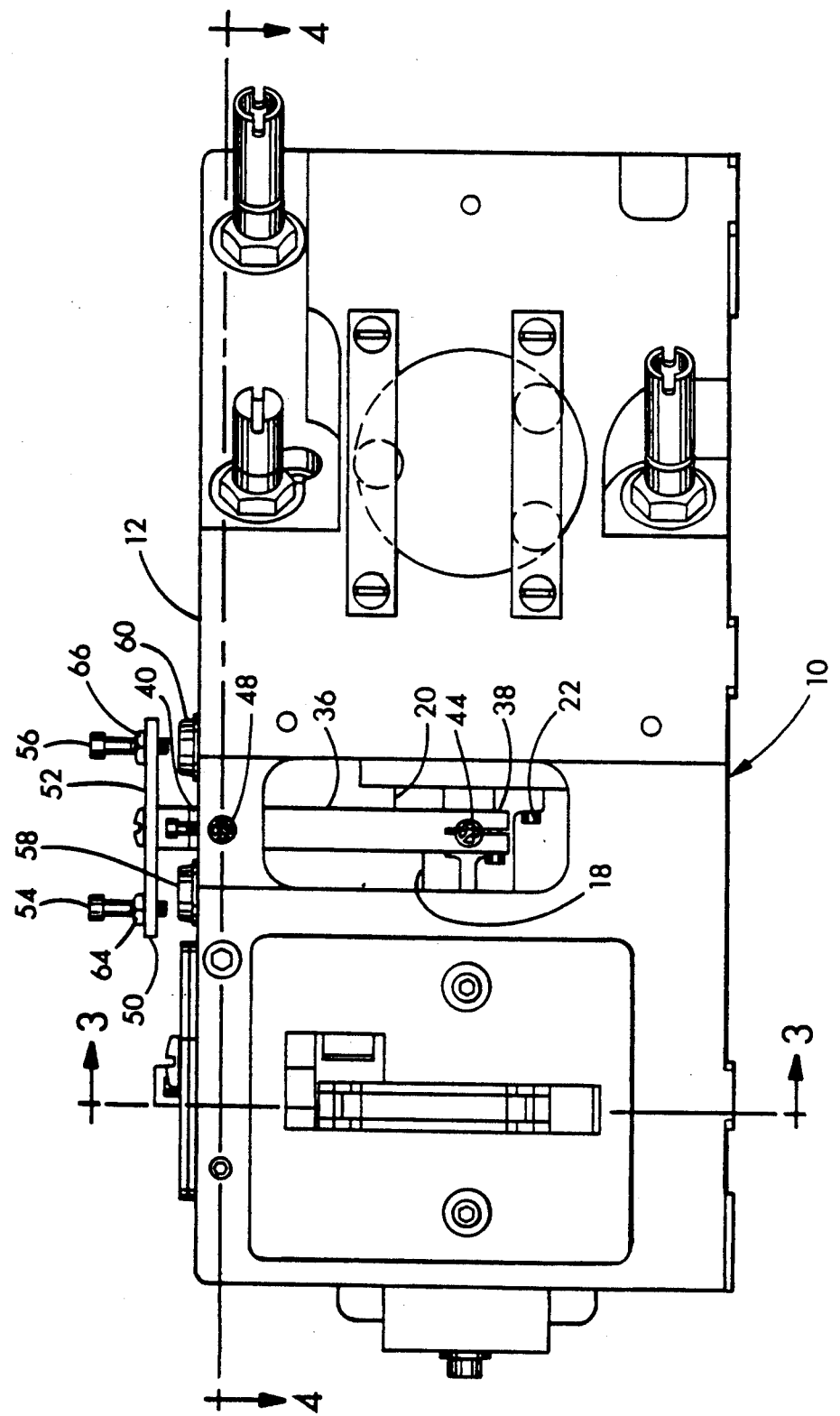
FIG. 2 is a front plan view of a interferometer modulator that uses the moving mirror tilt adjust mechanism of the present invention.
Figure 3:
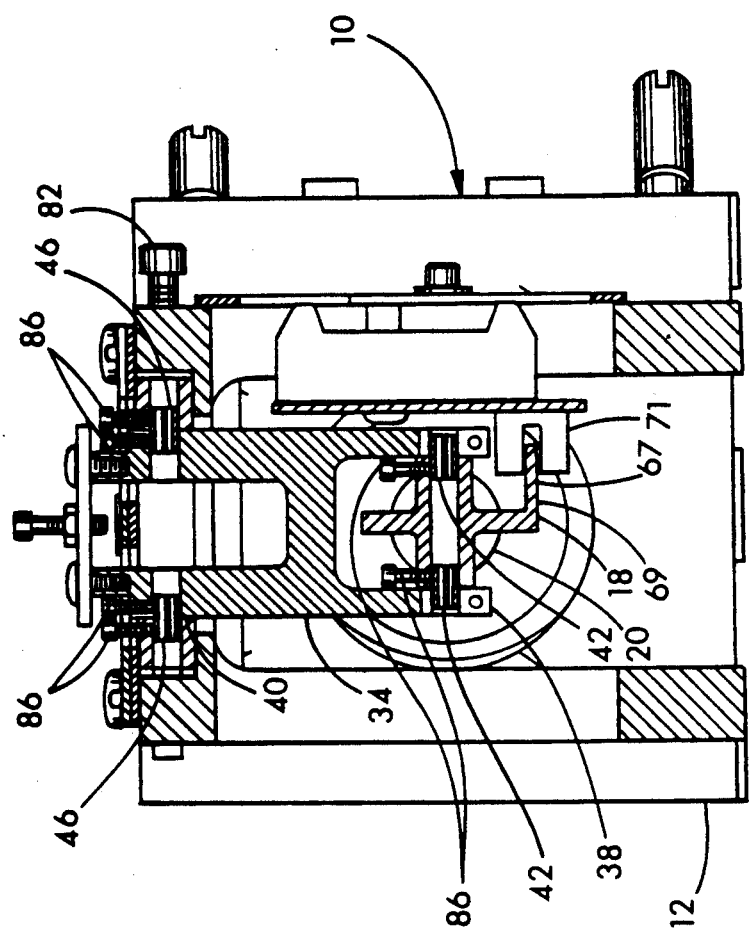
FIG. 3 is a cross-sectional view along line 3—3 of FIG. 2.
Figure 4:
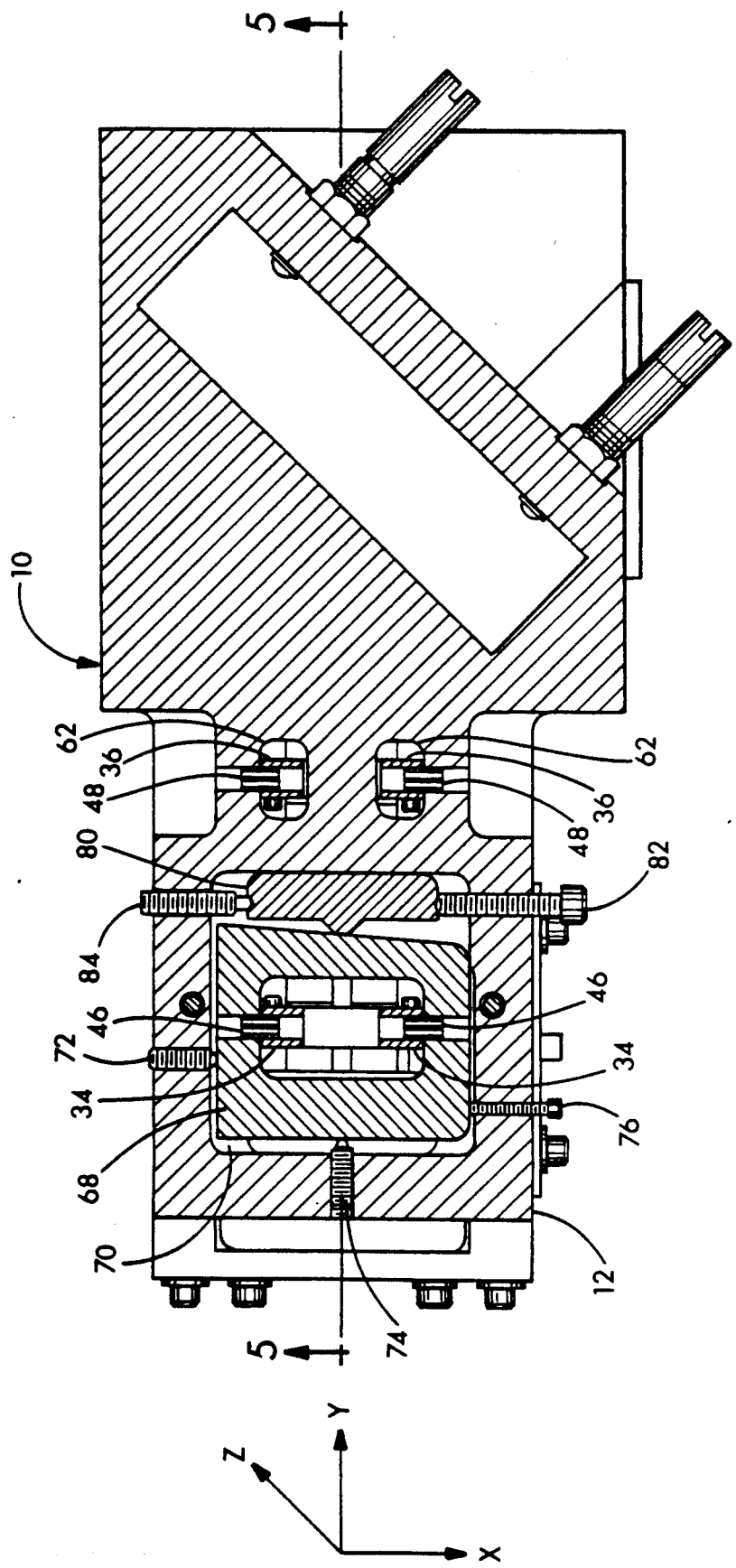
FIG. 4 is a cross-sectional view along line 4—4 of FIG. 2.
Figure 5:
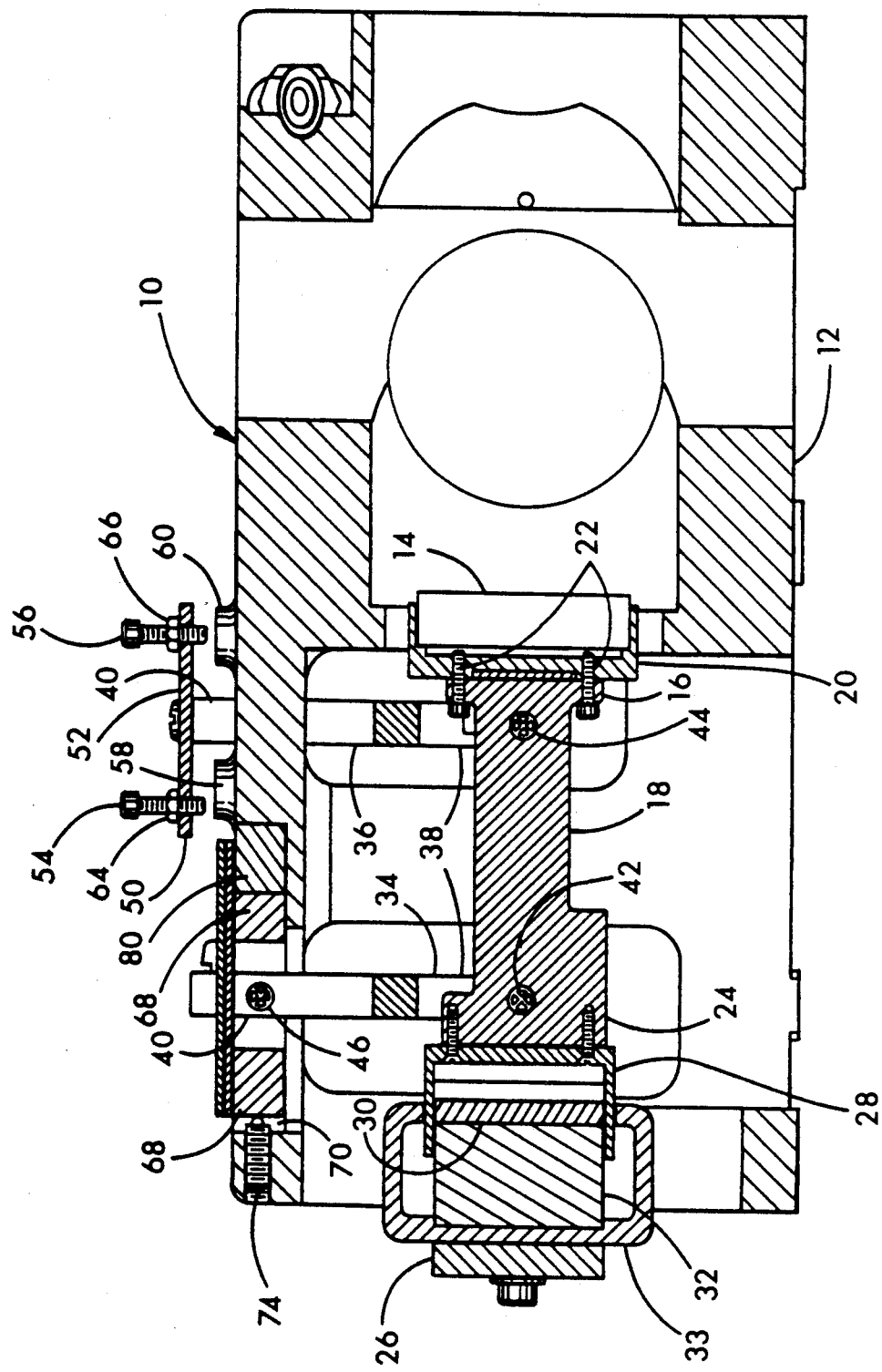
FIG. 5 is a cross-sectional view along line 5—5 of FIG. 4.
Figure 7:
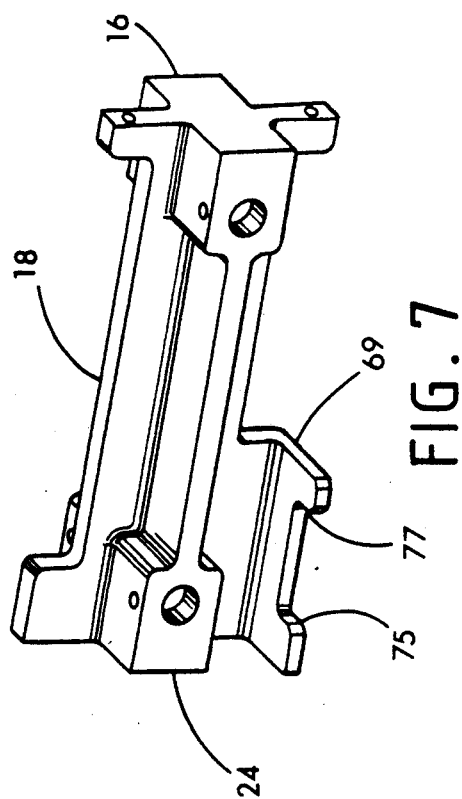
FIG. 7 is a perspective view of a mirror arm suitable for use in the present invention.
Figure 6:
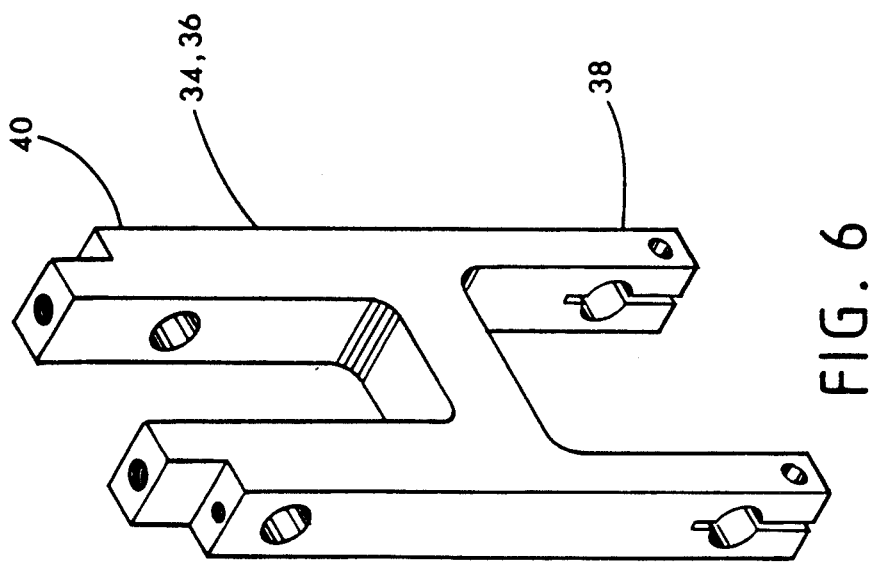
FIG. 6 is a perspective view of an H-shaped link suitable for use in the present invention.

With reference to the drawings, FIGS. 1 and 2 show a modulator 10 used in an FTIR spectrometer that modulates the analytical radiation used by the instrument to study samples and uses the moving mirror tilt adjust mechanism of the present invention. The spectrometer is an interferometer of the "porch swing38 type. FIGS. 3, 4, and 5 are various cross-sections through the modulator 10 showing a housing 12 that encloses a moving mirror 14 (shown in FIG. 5) and associated parts necessary to adjust the tilt of the moving mirror 14. As best shown in FIG. 5, the moving mirror 14 is attached to a first end 16 of a rigid mirror arm 18. A suitable means for attaching the moving mirror 14 to the mirror arm 18 is to glue the moving mirror 14 to a holder 20, which is in turn secured to the mirror arm 18 by screws 22. The second end 24 of the mirror arm 18 is attached to a modulator motor 26 comprising a coil 28, a pole piece 30, a magnet 32, and a motor housing 33. The mirror arm 18 is suspended from the housing 12 by links 34 and 36, each of which have a first end 38 and a second end 40. The first ends 38 of each of the links 34 and 36 are attached to the mirror arm 18 by swinging pivots 42 and 44, respectively. Each of the links 34 and 36 are preferably H-shaped, as best shown in FIG. 6, and are positioned at their first end 38 to straddle the mirror arm 18 at either of the pivots 42 or 44. The interferometer must be free of natural vibration resonances in the FTIR spectrum range of interest (100–4,000 cm$^{-1}$). The use of H-shaped links provides maximum mechanical stiffness and eliminates motion about undesirable axes which would result in undesirable vibrational resonances. The second ends 40 of each of the links 34 and 36 are attached to the adjustable block 68 and the housing 12 by fixed pivots 46 and 48, respectively. It is noted that there are two each of the pivots 42, 44, 46, and 48, in that the first and second ends 38 and 40 of the links 34 and 36 are forked by reason of the H-shaped configuration. Any remaining noise can be further reduced by dampening other components of the system such as the baseplate (not shown), the holder 20, or the beamsplitter (not shown). FIG. 6 shows a perspective of a typical link 34 or 36 that is unattached to either the mirror arm 18 or the housing 12. FIG. 7 shows an unassembled mirror arm 18.

Returning to FIG. 5, the mirror arm 18 is driven linear to movement by the motor 26 and the path of the mirror arm 18 is guided by the links 34 and 36. The maximum range of travel of the moving mirror 14 and the mirror arm 18 is dictated by a first limit assembly 50. The first limit assembly 50 includes a plate 52, two adjust screws 54 and 56, and two bumpers 58 and 60. The second end 40 of the link 36 extends through two openings 62 (visible in FIG. 4) to the exterior of the housing 12 and the plate 52 is mounted thereupon. The adjust screws 54 and 56 are threaded through the plate 52. The bumpers 58 and 60 are mounted upon the exterior of the housing 12 beneath the adjust screws 54 and 56, respectively. Upon maximum travel of the mirror arm 18 in one direction, the screw 54 will abut against the bumper 58; upon maximum travel of the mirror arm 18 in the opposite direction, the screw 56 will abut against the bumper 60. The adjust screws 54 and 56 may be adjusted and locked in place by nuts 64 and 66. A second limit assembly 67 is formed by a flag 69 that protrudes from the mirror arm 18 and a set of optical switches 71. The flag 69 is best depicted in FIG. 7 and the optical switches are best shown in FIG. 3. The flag 69 has a cutout region 73 with edges 75 and 77. When either of the edges 75 and 77 cut a light beam from one of the optical switches, a signal is sent to servo control to reverse the direction of the motor 26, and thus the mirror arm 18. The range of motion allowed by the second limit assembly 67 is the travel of the mirror arm 18 between which light from the optical switches 71 is not cut off by the edges 75 and 77. The first limit assembly 50 acts as a means of protecting the modulator 10 in the event that the second limit assembly 67 fails.

The fixed pivots 46 and 48 which join the respective links 34 and 36 to the housing 12 are best shown in FIG. 4. The housing 12 includes a block 68 in which the pivot 46 is mounted. The block 68 is positioned within an aperture 70 of the housing 12. The block 68 is bounded and held in place within the aperture 70 by spring plungers 72 and 74, adjust screw 76, and a cam 80. The position of the cam 80 is adjustable by the turning of an adjust screw 82 that is threaded through the housing 12 and which abuts against the cam 80. A spring plunger 84 is mounted to bias the cam 80 against the adjust screw 82. The surface of the block 68 that contacts the cam 80 is inclined relative to the travel of the cam 80 so that the turning of the adjust screw 82 causes movement of the block 68 that alters the distance between the pivots fixed 46 and 48. The spring plunger 74 biases the block 68 against the cam 80.

The position of the block 68 may also be adjusted by the turning of the adjust screw 76. The turning of the adjust screw 76 rotates the block 68 clockwise or counter clockwise in the orientation of FIG. 4 so that the links 34 and 36 may be brought into and out of the same plane of motion. The spring plunger 72 biases the block 68 against the adjust screw 76. The position of the pivot 48 remains stationary and is not adjustable.

Figure 8:
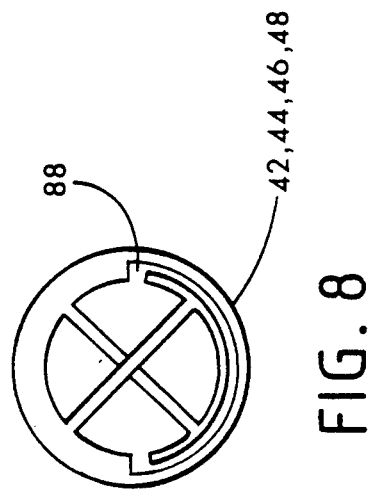
FIG. 8 is a detail view of a pivot suitable for use in the present invention.

For each of the pivots 42, 44, 46, and 48, use of "single end" or cantilever flexural-type pivots are preferred. Rotational flexural pivots provide the best mechanism repeatability due to their inherent zero friction spring action. Bearings, either jewel or precision ball/roller, can be used as a less expensive alternative. Bearings would generate some frictional losses but would also eliminate the opposing spring force and limited motion range of the flexured pivots. An exemplary flexural of pivot is a "Free Flex Flexural Pivot" made by Lucas Aerospace. Such pivots, common in the art, have a fixed mount section and a load section. To maximize load capacity of the pivots and to balance the spring loads, the load sections of the pivots 42, 44, 46, and 48 should be mounted within the links 34 and 36. The fixed mount section should be mounted within either the housing 12 or the mirror arm 18, as applicable. As shown in FIG. 3, screws 86 are used to secure the pivots 42, 44, 46, and 48. The screws 86 are tightened sufficiently to secure but not distort the pivots. FIG. 8 shows a detail of one of the pivots 42, 44, 46, and 48. The pivots 42, 44, 46, and 48 are mounted so that small gaps 88 are horizontally aligned and so that the solid joint of the pivot is "up" or non-weight bearing.

Adjustments made to the block 68 enable the user to horizontally and vertically align the moving mirror 14 so that the mirror 14 remains perpendicular to its line of motion. As shown in FIG. 4, "vertical" tilt is the tilt of the mirror about the x-axis. Tilt about the x-axis is referred to as vertical because of a resultant periodic vertical image shift in the autocollimator (not shown) of the spectrometer with each mirror swing. The turning of the adjust screw 82 changes the distance between pivots fixed 46 and 48 relative to the swinging pivots 42 and 44. When the former pivot-to-pivot distance matches the latter pivot-to-pivot distance, the mirror tilt about the x-axis is minimized.

"Horizontal tilt" refers to tilt about the z-axis. Horizontal tilt results from the links 34 and 36 not being parallel throughout the range of movement of the mirror arm 18, i.e., the links 34 and 36 do not swing in the same plane of motion. The turning of the adjust screw 76 rotates the block 68 clockwise or counterclockwise in the x-y plane to compensate for any angular differences that would prevent the links 34 and 36 from swinging in the same plane of motion. Thus, tilt about the z-axis is minimized.

While the swinging pivots 42 and 44 move coincident with the mirror arm 18, the fixed pivots 46 and 48 of the housing 12 are stationary even while the mirror arm 18 is moving. The incorporation of a block 68 that allows the stationary pivot 46 to be adjusted allows for adjustments to be made while the mirror 14 and mirror arm 18 are in motion. Thus the effect of any adjustment may be immediately seen.

An application could arise where only the horizontal tilt component, or only the vertical tilt, need be controlled. Under the circumstances, the tilt adjustment mechanism can be designed with only a horizontal tilt adjustment or only a vertical tilt adjustment.

It is understood that the invention is not confined to the particular construction and arrangement of parts herein illustrated and described, but embraces such modified forms thereof as come within the scope of the following claims.

What is claimed is:

1. A mechanism for adjusting the tilt in the moving mirror of a spectrometer to maintain perpendicularity of the moving mirror to the line of motion, the mechanism comprising:
    (a) a rigid mirror arm that is attached to a mirror and which is capable of movement along the line of motion;
    (b) a housing within which the mirror arm is positioned for movement;
    (c) two links each having a first end and a second end, each of the first ends of the links being attached to the arm at two swinging pivots at position along the length of the mirror arm that are spaced a fixed distance apart and each of the second ends of the links being attached to the housing at two independent fixed pivots; and
    (d) a block forming a portion of the housing and to which the second end of one of the links is attached, and means for adjusting the position of the block to adjust the distance between the swinging pivots along the length of a mirror arm and the fixed pivots of the housing.

2. The mechanism of claim 1 wherein the means for adjusting the position of the block includes a cam that is movable against the block to adjust the position of the block.

3. The mechanism of claim 2 further including an adjust screw that may be turned in the housing against or away from one side of the cam to adjust the position of the block.

4. The mechanism of claim 3 further including a plunger that is positioned against the cam to oppose the adjusting screw.

5. The mechanism of claim 2 further including a plunger that is positioned against the block to oppose the cam.

6. The mechanism of claim 2 wherein the block has an inclined surface relative to the travel of the cam and wherein the cam is moved against the inclined surface to adjust the position of the block.

7. The mechanism of claim 1 further including means for adjusting the position of the block to bring the links into parallelism in the planes of motion of the links.

8. The mechanism of claim 7 further including a second adjust screw that may be turned against or away from one side of the block to rotate the position of the block.

9. The mechanism of claim 1 wherein the links are H-shaped.

10. The mechanism of claim 1 wherein the pivots are flexural.

11. A mechanism for adjusting the tilt in the moving mirror of a spectrometer to maintain perpendicularity of the moving mirror to the line of motion, the mechanism comprising:
    (a) a rigid mirror arm that is attached to a mirror and which is capable of movement along the line of motion;
    (b) a housing within which the mirror arm is positioned for movement;
    (c) two links each having a first end and a second end, each of the first ends of the links being attached to the arm at two swinging pivots at positions along the length of the mirror arm that are spaced a fixed distance apart and each of the second ends of the links being attached to the housing at two independent fixed pivots; and
    (d) a block forming a portion of the housing and to which the second end of one of the links is attached, and means for adjusting the position of the block to bring the links into parallelism in the planes of motion of the links.

12. The mechanism of claim 11 wherein the means for adjusting includes an adjustment screw threaded through the housing and a plunger in the housing that is positioned against the block to oppose the adjust screw.

13. The mechanism of claim 11 further including means for adjusting the position of the block to adjust the distances between the swinging pivots along the length of the mirror arm and the fixed pivots of the housing.

14. The mechanism of claim 13 further including a cam that is movable against the block to adjust the position of the block.

15. The mechanism of claim 14 further including a second adjust screw that may be turned against or away from one side of the cam to adjust the position of the block.

16. The mechanism of claim 15 further including a plunger that is positioned against the cam to oppose the second adjust screw.

17. The mechanism of claim 14 further including a plunger that is positioned against the block to oppose the cam.

18. The mechanism of claim 14 wherein the block has an inclined surface relative to the line of mirror movement and wherein the cam is moved against the inclined surface to adjust the position of the block.

19. The mechanism of claim 11 wherein the links are H-shaped.

20. The mechanism of claim 11 wherein the pivots are flexured.

21. A mechanism for adjusting the tilt in the moving mirror of a spectrometer to maintain perpendicularity of the moving mirror to the line of motion, the mechanism comprising:
   (a) a rigid mirror arm that is attached to a mirror and which is capable of movement along the line of motion;
   (b) a housing within which the mirror arm is positioned for movement;
   (c) two links each having a first end and a second end, each of the first ends of the links being attached to the arm at two swinging pivots at positions along the length of the mirror arm that are spaced a fixed distance apart and each of the second ends of the links being attached to the housing at two independent fixed pivots; and
   (d) a block forming a portion of the housing and to which the second end of one of the links is attached, and means for adjusting the position of the block to adjust the distances between the swinging pivots along the length of the mirror arm and the fixed pivots of the housing, and for adjusting the position of the block to bring the links into parallelism in the planes of motion of the links.

22. The mechanism of claim 21 whereas the means for adjusting includes a cam that is movable against the block to adjust the position of the block.

23. The mechanism of claim 22 further including an adjust screw that may be turned against or away from one side of the cam to adjust the position of the block.

24. The mechanism of claim 23 further including a plunger that is positioned against the cam to oppose the adjusting screw.

25. The mechanism of claim 22 further including a plunger that is positioned against the block to oppose the cam.

26. The mechanism of claim 22 wherein the block has an inclined surface relative to the line of mirror movement and wherein the cam is moved against the inclined surface to adjust the position of the block.

27. The mechanism of claim 23 further including a second adjust screw that may be turned against or away from one side of the block to rotate the block.

28. The mechanism of claim 27 further including a plunger that is positioned against the block to oppose the second adjust screw.

29. The mechanism of claim 21 wherein the links are H-shaped.

30. The mechanism of claim 21 wherein the pivots are flexural.

* * * * *